United States Patent
Seino

[11] Patent Number: 6,104,847
[45] Date of Patent: Aug. 15, 2000

[54] OPTICAL DEVICE HAVING AN OPTICAL WAVEGUIDE STRUCTURE

[75] Inventor: Minoru Seino, Kawasaki, Japan

[73] Assignee: Fujitsu Limited, Kawasaki, Japan

[21] Appl. No.: 09/017,692

[22] Filed: Feb. 3, 1998

[30] Foreign Application Priority Data

Jul. 28, 1997 [JP] Japan ................................. 9-201825

[51] Int. Cl.⁷ .................................................. G02B 6/12
[52] U.S. Cl. ............................................. 385/14; 359/124
[58] Field of Search .................... 385/14, 132; 359/124, 359/127, 130

[56] References Cited

U.S. PATENT DOCUMENTS

| | | | |
|---|---|---|---|
| 5,199,099 | 3/1993 | Dalgoutte | 385/14 |
| 5,357,122 | 10/1994 | Okubora et al. | 385/14 |
| 5,629,995 | 5/1997 | Duck et al. | 359/124 |
| 5,818,986 | 10/1998 | Asawa et al. | 385/14 |
| 5,859,717 | 1/1999 | Scobey et al. | 385/24 |
| 5,936,752 | 8/1999 | Bishop et al. | 359/124 |

FOREIGN PATENT DOCUMENTS

0367675  5/1990  European Pat. Off. .
3-291603  12/1991  Japan ........................................ 385/14

*Primary Examiner*—Rodney Bovernick
*Assistant Examiner*—Robert E. Wise
*Attorney, Agent, or Firm*—Staas & Halsey

[57] ABSTRACT

A compact optical device operating as a WDM (wavelength division multiplexing) filter is provided. The optical device includes a slab optical waveguide having first and second end faces opposed to each other, a plurality of first optical waveguides connected to the first end face of the slab optical waveguide, and a plurality of second optical waveguides connected to the second end face of the slab optical waveguide. Each of the second optical waveguides includes a first cavity connected to the slab optical waveguide and a second cavity acutely connected through a first reflecting surface to the first cavity. The second cavity is terminated by a second reflecting surface. Each second cavity is so configured as to be folded back to the corresponding first cavity, so that the optical device can be made compact in setting a required optical path difference between the second optical waveguides. This optical device can be used as an optical multiplexer or an optical demultiplexer in a system adopting WDM.

29 Claims, 7 Drawing Sheets

OPTICAL DEVICE HAVING AN OPTICAL WAVEGUIDE STRUCTURE

BACKGROUND OF THE INVENTION

1. Field of the Invention

The present invention relates generally to an optical device having an optical waveguide structure, and more particularly to an optical device suitably used as an optical multiplexer or an optical demultiplexer in a system adopting wavelength division multiplexing.

2. Description of the Related Art

In recent years, processing of massive amounts of information has been needed with development of an advanced information society, and optical fiber communications fit for a large capacity have been applied to a transmission network for transmitting information. While a transmission rate of information in optical fiber communications has already reached 2.4 Gb/s or 10 Gb/s, a further increase in transmission capacity will be needed in a motion picture captured communications system that is expected to be put to practical use in the future. For example, a transmission capacity exceeding 1 terabits per second (Tb/s) will be needed in a trunk system.

Wavelength division multiplexing (WDM) is known as one of the techniques for increasing a transmission capacity in optical fiber communications. In a system adopting WDM, a plurality of optical carriers having different wavelengths are used. A plurality of optical signals obtained by independently modulating the plural optical carriers are wavelength division multiplexed by an optical multiplexer, and the resultant WDM optical signals are sent out to an optical fiber transmission line. On a receiving side, the WDM optical signals received are separated into individual optical signals by an optical demultiplexer, and transmitted data is reproduced according to the optical signals. Accordingly, by applying WDM, a transmission capacity in one optical fiber can be increased according to the number of WDM channels.

On the other hand, in performing WDM, the number of WDM channels is set to a wide range of several channels to about 100 channels depending upon systems. Further, a wide range of wavelength spacing of 1 nm or less to tens of nm is required. In applying WDM to a subscriber system, it is required to provide components at low prices. Accordingly, in WDM, a WDM filter usable as an optical multiplexer and/or an optical demultiplexer is a key device.

In another aspect, the application of WDM has recently been tried also in the field of measurement, and a WDM filter is an important component also in this field.

Figure 1:
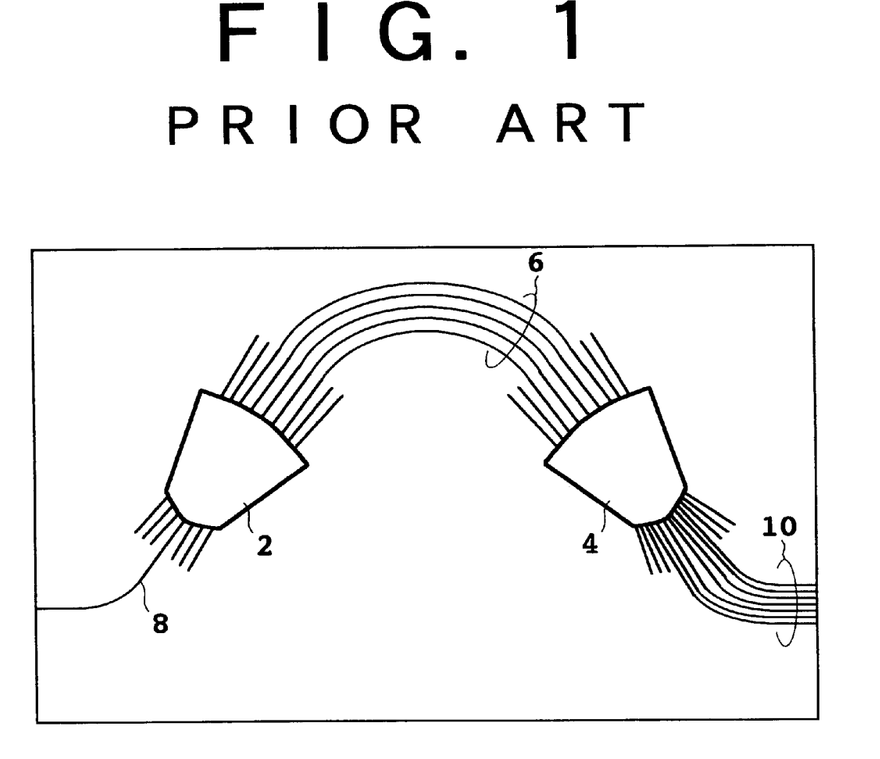
FIG. 1 is a plan view showing a conventional WDM filter.

FIG. 1 is a plan view showing a conventional WDM filter usable as an optical multiplexer and/or an optical demultiplexer. This WDM filter includes a pair of slab optical waveguides (planar optical waveguides) 2 and 4 and a plurality of optical waveguides (arrayed optical waveguides) 6 for connecting the slab optical waveguides 2 and 4. The optical waveguides 6 have different optical path lengths. More specifically, the optical waveguides 6 are formed so that a phase difference by an integral multiple of 2π between any adjacent ones of the optical waveguides 6 is given to light having a specific wavelength.

To obtain the function of an optical demultiplexer, at least one input optical waveguide 8 is connected to the slab optical waveguide 2 on the side opposite to the optical waveguides 6, and a plurality of output optical waveguides 10 are connected to the slab optical waveguide 4 on the side opposite to the optical waveguides 6. Diffraction occurs in a diffraction grating including the optical waveguides 6, and as the result the input optical waveguide 8 and each output optical waveguide 10 are coupled together by a specific wavelength. Accordingly, when WDM optical signals are supplied to the input optical waveguide 8, the optical signals in different wavelength channels are respectively output from the output optical waveguides 10.

In the case of using this WDM filter as an optical multiplexer, optical signals in different wavelength channels are respectively supplied to the optical waveguides 10. The optical signals are then wavelength division multiplexed, and the resultant WDM optical signals are output from the optical waveguide 8.

Figure 2:
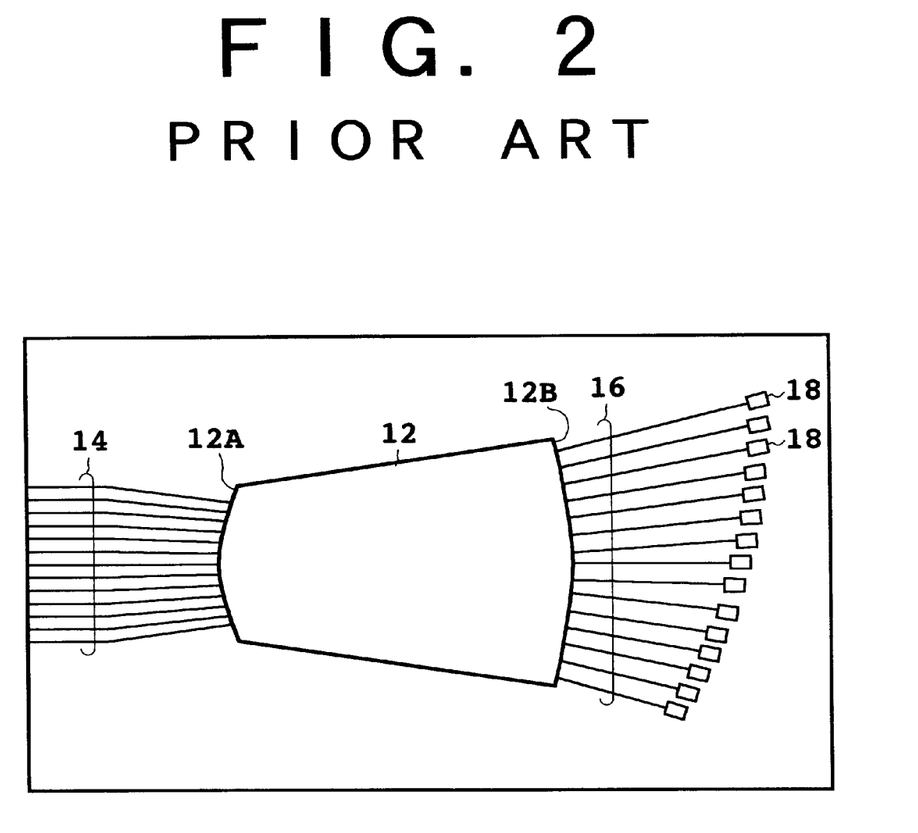
FIG. 2 is a plan view showing another conventional WDM filter.

FIG. 2 is a plan view showing another conventional WDM filter usable as an optical multiplexer and/or an optical demultiplexer. This WDM filter includes a slab optical waveguide 12 having end faces 12A and 12B, a plurality of first optical waveguides 14 optically connected to the end face 12A of the slab optical waveguide 12, and a plurality of second optical waveguides 16 optically connected to the end face 12B of the slab optical waveguide 12. One of two end portions of each optical waveguide 16 is optically connected to the end face 12B of the slab optical waveguide 12, and a reflecting element 18 is connected directly to the other end portion of each optical waveguide 16. Each optical waveguide 16 has a substantially uniform width. To make the optical waveguides 16 and the reflecting elements 18 substantially function as a diffraction grating, the optical waveguides 16 have different optical path lengths. More specifically, the optical waveguides 1 6 are formed so that a phase different by an integral multiple of 2π between any adjacent ones of the optical waveguides 16 is given to reflected light having a specific wavelength reciprocating in the optical waveguides 16. In this WDM filter, it is sufficient to provide the single slab optical waveguide 12, so that the size of the WDM filter can be made smaller than that of the WDM filter shown in FIG. 1.

In the case of using this WDM filter as an optical demultiplexer, one of the optical waveguides 14 is used as an input port, and the others are used as output ports. Conversely, in the case of using this WDM filter as an optical multiplexer, one of the optical waveguides 14 is used as an output port, and the others are used as input ports.

Figure 3:
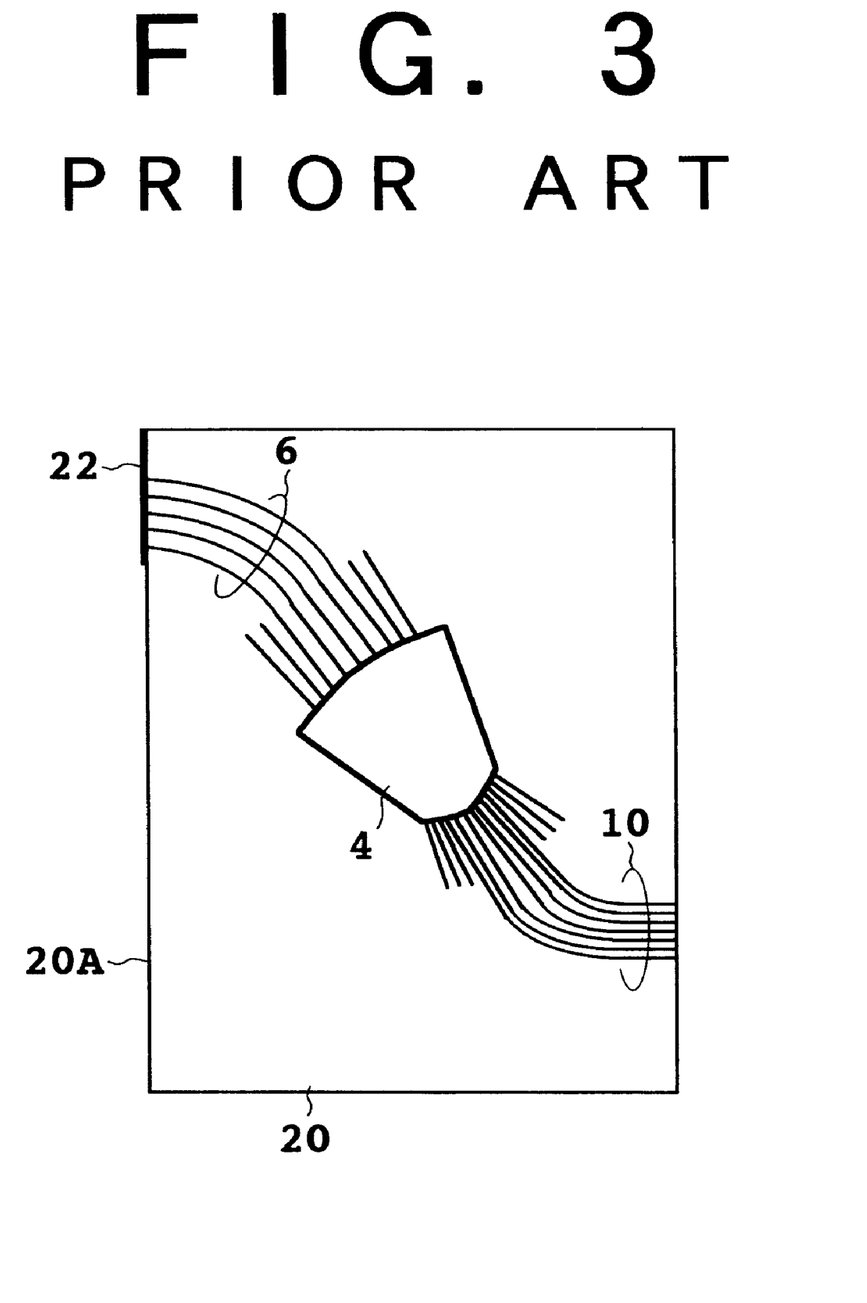
FIG. 3 is a plan view showing a further conventional WDM filter.

FIG. 3 is a plan view showing a further conventional WDM filter usable as an optical multiplexer and/or an optical demultiplexer. To reduce the size of the WDM filter shown in FIG. 1 to a substantially half, a substrate 20 is cut so that the length of each optical waveguide 6 becomes just half, and a reflecting film 22 is formed on a cut end face 20A of the substrate 20.

In the case that the WDM filter shown in FIG. 3 is used as an optical demultiplexer, one of the optical waveguides 10 is used as an input port, and the others are used as output ports. Conversely, in the case that the WDM filter is used as an optical multiplexer, one of the optical waveguides 10 is used as an output port, and the others are used as input ports.

The WDM filter shown in FIG. 1 tends to become large in size. Such a large size is due to the facts that the optical waveguides 6 must be made long to generate an optical path difference required in the diffraction grating including the optical waveguides 6 and that the two slab optical waveguides 2 and 4 are required.

The WDM filter shown in FIG. 2 has a problem that it is not easy to manufacture because a manufacturing process for each reflecting element 18 is complicated. For example, in the case of providing each reflecting element 18 by a diffraction grating, it is necessary to carry out a complicated manufacturing process including plural times of exposure for obtaining the diffraction grating.

It may be tried to obtain each reflecting element 18 by a simple process including the steps of forming an end face of each optical waveguide 16 perpendicular to its optical path and forming a reflection film directly on the perpendicular end face. Although the perpendicular end face can be obtained by etching, the etching causes a substantial deterioration of the perpendicularity of the end face, especially an edge portion of the end face. Such a deterioration of the perpendicularity is partially due to the fact that, for example, the etching rate for silica glass suitable as the material of each optical waveguide 16 is low.

To the contrary, the WDM filter shown in FIG. 3 is relatively easy to manufacture. That is, in manufacturing the WDM filter shown in FIG. 2, it is difficult to provide each reflecting element 18 by a cut end face of the substrate because the reflecting elements 18 are not arranged on a straight line. To the contrary, in manufacturing the WDM filter shown in FIG. 3, the reflecting film 22 can be easily formed because the cut end face 20A of the substrate 20 is straight and its perpendicularity is satisfactory. However, although the WDM filter shown in FIG. 3 can be reduced in size to a substantially half as compared with the WDM filter shown in FIG. 1, the size reduction of the WDM filter shown in FIG. 3 is insufficient as compared with the WDM filter shown in FIG. 2.

SUMMARY OF THE INVENTION

It is therefore an object of the present invention to provide an optical device suitable for obtaining a WDM filter which is fit for size reduction and easy to manufacture.

In accordance with the present invention, there is provided an optical device operating as a WDM filter. This optical device includes a slab optical waveguide having first and second end faces opposed to each other, a plurality of first optical waveguides connected to the first end face of the slab optical waveguide, and a plurality of second optical waveguides connected to the second end face of the slab optical waveguide. Each of the second optical waveguides includes a first cavity connected to the slab optical waveguide and a second cavity acutely connected through a first reflecting surface to the first cavity. The second cavity is terminated by a second reflecting surface.

With this configuration, each second cavity can be so configured as to be folded back to the corresponding each first cavity, so that the optical device can be made smaller in size than the WDM filter shown in FIG. 3 in the case of setting the same optical path difference between the second optical waveguides. Furthermore, the first reflecting surfaces respectively corresponding to the first cavities of the second optical waveguides can be arranged on a straight line, and the second reflecting surfaces respectively corresponding to the second cavities of the second optical waveguides can also be arranged on another straight line. Accordingly, in the case of obtaining each straight line by using a dicing saw, for example, the perpendicularity of each reflecting surface can be easily obtained, thereby improving the manufacturability of the optical device. By such forming each reflecting surface perpendicularly to the optical path, loss at each reflecting surface can be suppressed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail.

Figure 4:
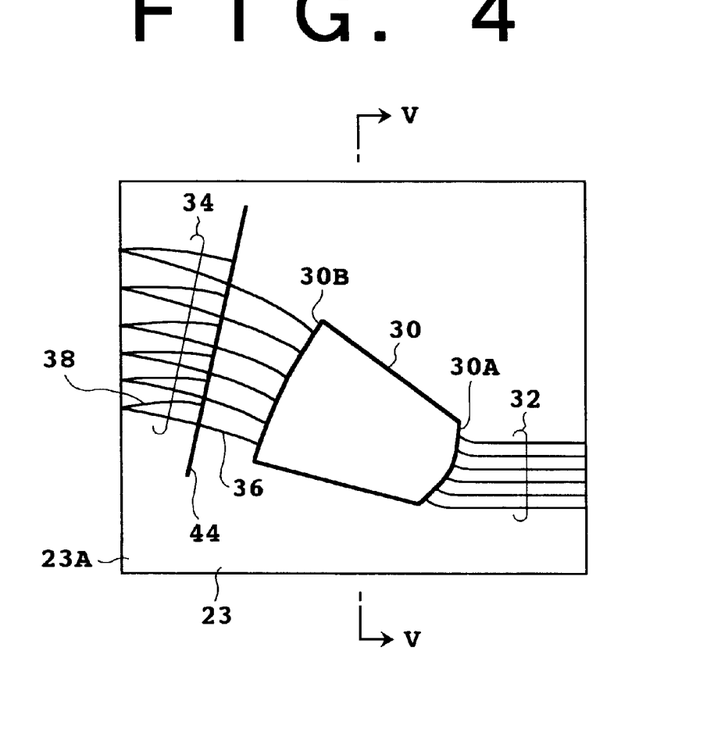
FIG. 4 is a plan view showing a first preferred embodiment of the WDM filter according to the present invention.
Figure 5:
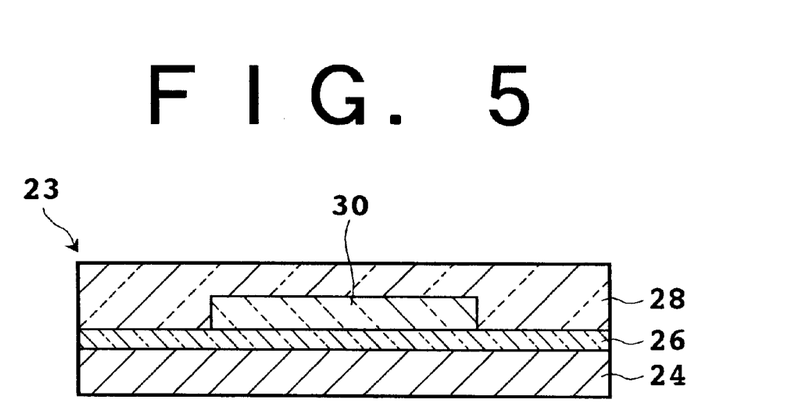
FIG. 5 is a cross section taken along the line V—V in FIG. 4.
Figure 6A:
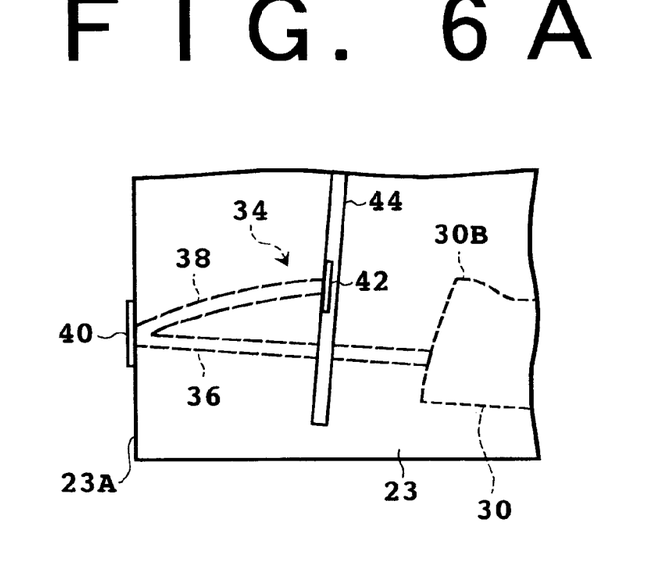
FIG. 6A is an enlarged view of an essential part of the WDM filter shown in FIG. 4.

FIG. 4 is a plan view showing a first preferred embodiment of the WDM (wavelength division multiplexing) filter according to the present invention, FIG. 5 is a cross section taken along the line V—V in FIG. 4, and FIG. 6A is an enlarged view of an essential part of the WDM filter shown in FIG. 4.

This WDM filter is provided by an optical waveguide substrate 23 and an optical waveguide structure provided in the optical waveguide substrate 23. As best shown in FIG. 5, the optical waveguide substrate 23 includes a substrate 24 of Si, a buffer layer 26 formed on the substrate 24, and an overcladding 28 formed on the buffer layer 26. Each of the buffer layer 26 and the overcladding 28 is obtained by doping $SiO_2$ (silica glass) with fluorine, and has a relatively low refractive index. The optical waveguide structure is interposed between the buffer layer 26 and the overcladding 28, and has a relatively high refractive index. The relatively high refractive index of the optical waveguide structure is obtained by $SiO_2$ free from a dopant, for example.

More specifically, as shown in FIG. 4, the optical waveguide structure includes a slab optical waveguide (planar optical waveguide) 30 having end faces 30A and 30B opposed to each other, a plurality of first optical waveguides 32 optically connected to the end face 30A of the slab optical waveguide 30, and a plurality of second optical waveguides 34 optically connected to the end face 30B of the slab optical waveguide 30. Each of the second optical waveguides 34 is composed of a first cavity 36 connected to the end face 30B of the slab optical waveguide 30 and a second cavity 38 acutely connected to the first cavity 36. The end faces 30A and 30B of the slab optical waveguide 30 are defined by a boundary surface between the slab optical waveguide 30 and the overcladding 28.

FIG. 6A is an enlarged view of one of the optical waveguides 34 and its near portion. The first cavity 36 and the second cavity 38 are optically coupled by a reflector 40, and the second cavity 38 is terminated by a reflector 42. A reflecting surface of the reflector 40 is obtained by a reflecting film formed on an end face 23A of the optical waveguide substrate 23, and a reflecting surface of the reflector 42 is obtained by a reflecting film formed in a groove 44 formed on the optical waveguide substrate 23.

As understood from FIG. 4, the optical waveguides 34 have different optical path lengths so that the optical waveguides 34 and the reflector 42 function as a reflection type diffraction grating. More specifically, the optical path difference between any adjacent ones of the optical waveguides 34 is set to give a phase difference by an integral multiple of $2\pi$ to reflected light having a specific wavelength. As the result of diffraction by the reflection type diffraction grating, one of the optical waveguides 32 and another or the other optical waveguides 32 are coupled by a specific wavelength. Accordingly, multiplexing and demultiplexing on WDM optical signals can be performed by using this WDM filter.

In the case that this WDM filter is used as an optical multiplexer, one of the optical waveguides 32 serves as an output port for outputting WDM optical signals, and the others serve as input ports for optical signals in individual wavelength channels. Conversely, in the case that this WDM filter is used as an optical demultiplexer, one of the optical waveguides 32 serves as an input port for receiving WDM optical signals, and the others serve as output ports for optical signals in individual wavelength channels.

In the case that each of the reflectors 40 and 42 is provided by a reflecting film, the perpendicularity of the reflecting film to an optical path of light incident on the reflecting film has an effect on a reflection efficiency as mentioned above. In this preferred embodiment, the reflectors 40 for the respective first cavities 36 can be arranged on a first straight line obtained by the end face 23A of the optical waveguide substrate 23, and the reflectors 42 for the respective second cavities 38 can be arranged on a second straight line obtained by the groove 44 on the optical waveguide substrate 23. Accordingly, the perpendicularity of the reflecting surfaces of the reflectors 40 and 42 can be easily ensured. That is, since a cutting technique and a grooving technique for an optical waveguide substrate by a cutting saw have already been established, the perpendicularity of the reflecting surface of each reflector 40 to the corresponding optical path can be sufficiently ensured by providing the end face 23A by cutting the optical waveguide substrate with a cutting saw, and the perpendicularity of the reflecting surface of each reflector 42 to the corresponding optical path can be sufficiently ensured by straight forming the groove 44 by grooving the optical waveguide substrate with a cutting saw.

In this preferred embodiment, the second straight line (the groove 44) is inclined with respect to the first straight line (the end face 23A), thereby setting the above-mentioned optical path difference between the optical waveguides 34. By such inclination of the second straight line with respect to the first straight line, the optical path difference between the optical waveguides 34 can be easily set. Alternatively, the optical path difference between the optical waveguides 34 may be set by patterning without inclination of the second straight line with respect to the first straight line.

As each of the reflectors 40 and 42, a reflecting film formed from copper, copper alloy, or dielectric multilayer film may be used. In the case of using copper or copper alloy for the reflecting film, reflection loss in a wavelength band of 1.55 $\mu$m (1.50 $\mu$m to 1.60 $\mu$m) can be sufficiently reduced. In the case of using a dielectric multilayer film for the reflecting film, a wavelength band in which reflection loss is low can be easily designed by the multilayer configuration of the dielectric multilayer film, for example.

In this preferred embodiment, the end face 30B of the slab optical waveguide 30 is arcuately formed, and at least portions of the optical waveguides 34 in the vicinity of the slab optical waveguide 30 are so arranged as to extend radially from the center of the arc forming the end face 30B. More specifically, each of the end faces 30A and 30B of the slab optical waveguide 30 forms a Rowland circle. Accordingly, the efficiency of coupling of one of the optical waveguides 32 and another by a specific wavelength can be enhanced.

The above-mentioned perpendicularity of each reflector 40 to the corresponding optical path is one in a plane perpendicular to the sheet plane of FIG. 6A. In a plane parallel to the sheet plane of FIG. 6A, the angle formed by each cavity 36 and the corresponding reflector 40 is set substantially equal to the angle formed by each cavity 38 and the corresponding reflector 40, because each cavity 36 and the corresponding cavity 38 are reflectively coupled together by the corresponding reflector 40. The angle formed by each cavity 36 and the corresponding cavity 38 is set preferably in the range of 2° to 20°. If this angle is too small, the reflective coupling efficiency becomes low, whereas if this angle is too large, the effect by size reduction is reduced.

To improve the reflection efficiency at each reflector 42, each cavity 38 is perpendicularly connected to the corresponding reflector 42 both in a plane parallel to the sheet plane of FIG. 6A and in a plane perpendicular to the sheet plane of FIG. 6A.

In this preferred embodiment, the number of the optical waveguides 32 is 10 to 20, and the number of the optical waveguides 34 is about 80. The width and height of each of the optical waveguides 32 and 34 are both about 6 $\mu$m, and the optical path difference between any adjacent ones of the optical waveguides 34 is about 100 $\mu$m.

Since each optical waveguide 34 is so configured as to be folded back at the end face 23A of the optical waveguide substrate 23 in this preferred embodiment, a compact WDM filter can be provided. Further, since the reflectors 40 and 42 can be arranged on the respective straight lines, the manufacturability of the WDM filter can be improved by cutting and grooving an optical waveguide substrate with a dicing saw, for example.

The cavity 36 of each optical waveguide 34 is divided by the groove 44 of the optical waveguide substrate 23. To suppress loss as such a divided portion of the cavity 36, the width of the groove 44 is preferably set substantially equal to the width of the cavity 36. More specifically, the width of the groove 44 is set preferably in the range of 3 to 10 $\mu$m. If the width of the groove 4 is too small, the formation of each reflector 42 is difficult, whereas if the width of the groove 44 is too large, the loss in each cavity 36 is increased.

Figure 6B:
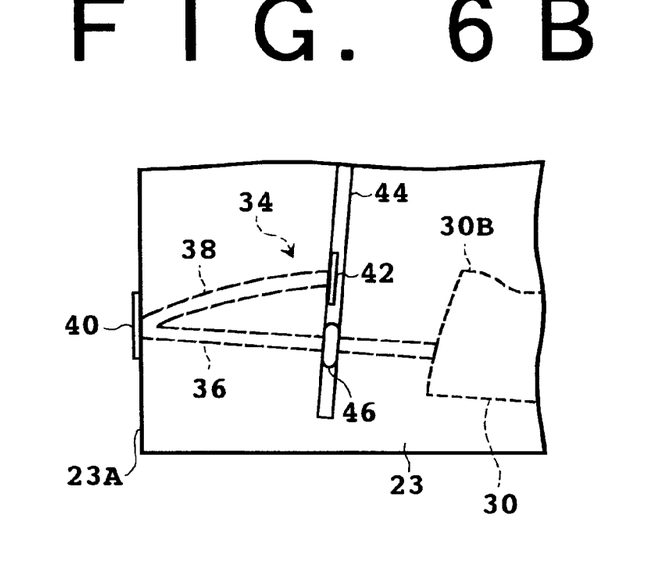
FIG. 6B is a view similar to FIG. 6A, showing a modification.

In the case that the width of the groove 44 must be set large in response to requirements in manufacturing techniques or the like, it is preferable to fill the divided portion of each cavity 36 in the groove 44 with a filler 46 having transparency, that is, having a refractive index substantially equal to the refractive index of the cavity 36 as shown in FIG. 6B. With this configuration, beam spreading in the groove 44 can be reduced to thereby suppress the loss in each cavity 36. The filler 46 is formed preferably of a polymeric material such as polyimide or polysiloxane (silicone), thereby allowing easy filling of the groove 44 at the divided portion with the filler 46.

The temperature coefficient of refractive index of silica glass forming the optical waveguide structure usually takes positive values, whereas the temperature coefficient of refractive index of a polymeric material most takes negative values. Accordingly, by filling the groove 44 at the divided portion of each cavity 36 with the filler 46 having a temperature coefficient of refractive index different in sign from the temperature coefficient of refractive index of the optical waveguide structure, a change in optical path length of each optical waveguide 34 due to a temperature change can be suppressed, thereby allowing provision of a WDM filter having a wide usable temperature range. For example, the absolute value of the temperature coefficient of refractive index of polyimide is larger by two orders of magnitude than the absolute value of the temperature coefficient of refractive index of silica glass. Therefore, even in the case that the optical path length in the filler 46 is about 1/100 of the optical path length of each optical waveguide 34, the effect of suppressing a change in the optical path length due to a temperature change is great.

FIGS. 7A to 7D illustrate a manufacturing process for the WDM filter according to the first preferred embodiment.

Figure 7A:
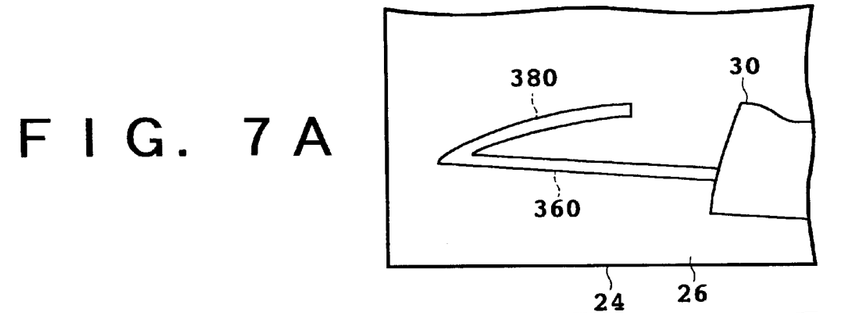
FIGS. 7A to 7D are plan views illustrating a manufacturing process for the WDM filter shown in FIG. 4.

As shown in FIG. 7A, a buffer layer 26 (see FIG. 5) of fluorine doped $SiO_2$ having a low refractive index is formed on a substrate 24 of Si by plasma CVD, and a fluorine undoped $SiO_2$ layer having a high refractive index is next formed on the buffer layer 26 by plasma CVD. The undoped $SiO_2$ layer is next partially removed by dry etching to obtain cores 360 and 380 to be formed into cavities 36 and 38, respectively, and to also obtain a slab optical waveguide 30. While optical waveguides 32 are also formed at this time, they are not shown in FIG. 7A. The cores 360 and 380 have a substantially V-shaped configuration as viewed in plan.

Figure 7B:
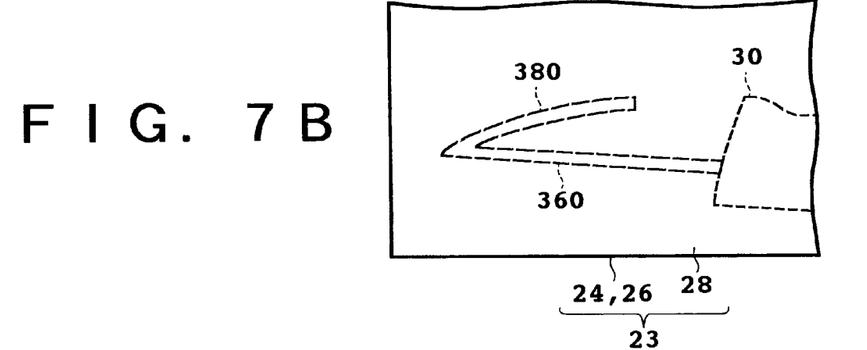

As shown in FIG. 7B, an overcladding 28 of fluorine doped $SiO_2$ having a low refractive index is next formed over the entire surface of the substrate 24 by plasma CVD. Thus, a optical waveguide substrate 23 is obtained.

Figure 7C:
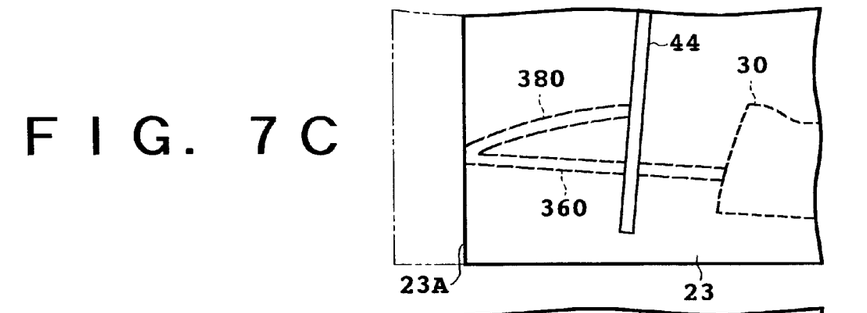

As shown in FIG. 7C, the optical waveguide substrate 23 is cut by a cutting saw in such a manner that a front end portion of the V-shape by the cores 360 and 380 is removed, thereby obtaining an end face 23A of the optical waveguide substrate 23 to which the cores 360 and 380 are exposed. Further, the upper surface of the optical waveguide substrate 23 is cut by a cutting saw to form a groove 44 on the optical waveguide substrate 23 in such a manner that an end portion of the core 380 is exposed to the groove 44. At this time, the perpendicularity of the end face 23A to the optical path in a plane perpendicular to the sheet plane of FIG. 7C is sufficiently ensured, and the perpendicularity of the core 380 to the wall surface of the groove 44 in planes perpendicular and parallel to the sheet plane of FIG. 7C is also sufficiently ensured.

Figure 7D:
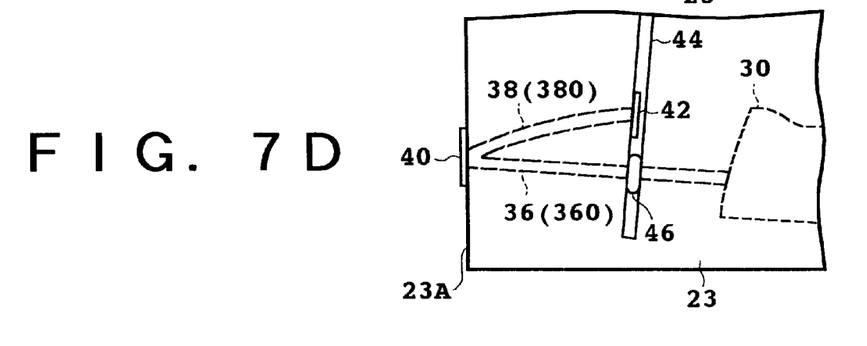

As shown in FIG. 7D, a reflector 40 is formed on the exposed surfaces of the cores 360 and 380 exposed to the end face 23A of the optical waveguide substrate 23, and a reflector 42 is formed on the exposed surface of the core 380 exposed to the wall surface of the groove 44. Further, a filler 46 as mentioned above is inserted into the groove 44 at a divided portion of the core 360 divided by the groove 44 as required. Thus, the cavity 36 connected to the slab optical waveguide 30 and the cavity 38 acutely connected through the reflector 40 to the cavity 36 are obtained, and the cavity 38 is terminated by the reflector 42. Each of the reflectors 40 and 42 may be obtained by forming a reflecting film of metal or multilayered dielectric as mentioned above by evaporation or sputtering.

In the case that the optical waveguide structure is provided mainly by silica glass ($SiO_2$) as in this preferred embodiment, a required value of refractive index and a required shape of the optical waveguide structure can be easily obtained, and the polarization dependence in the WDM filter can be eliminated.

As will be hereinafter described, at least one of the first and second straight lines may be made plural. In this case, the optical path difference between the optical waveguides can be effectively set, and the number of the optical waveguides per unit area of the optical waveguide substrate can be increased.

Figure 8:
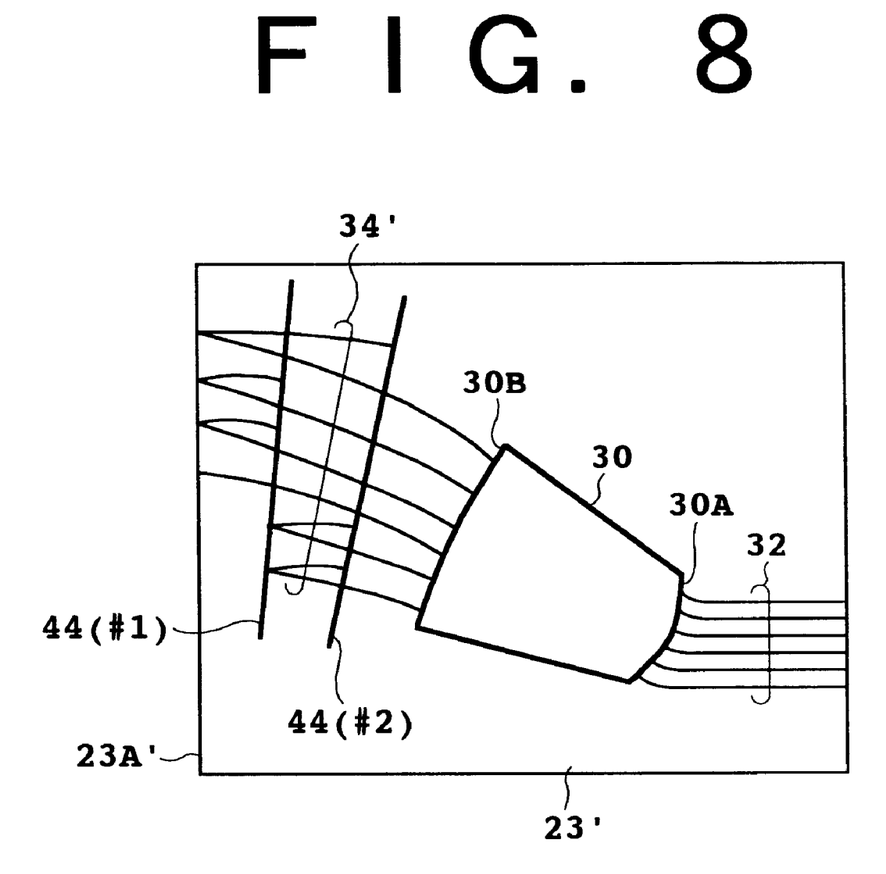
FIG. 8 is a plan view showing a second preferred embodiment of the WDM filter according to the present invention.

FIG. 8 is a plan view showing a second preferred embodiment of the WDM filter according to the present invention. A slab optical waveguide 30 and optical waveguides 32 are similar to those in the first preferred embodiment. The difference of the second preferred embodiment from the first preferred embodiment is that two grooves 44 (#1 and #2) are formed on an optical waveguide substrate 23' and accordingly a plurality of optical waveguides 34' for providing a reflection type diffraction grating are differently arranged. Reference numeral 23A' denotes an end face obtained by cutting the optical waveguide substrate 23'.

The optical waveguides 34' are connected to an end face 30B of the slab optical waveguide 30. The groove 44 (#1) is inclined with respect to the end face 23A', and the groove 44 (#2) is also inclined in the same direction as that of the inclination of the groove 44 (#1). The optical waveguides 34' shown are first to sixth optical waveguides counted from the lower side in FIG. 8. Cavities 36' and 38' of each of the first and second optical waveguides are reflectively coupled together at the groove 44 (#1), and the cavity 38' of each of the first and second optical waveguides is reflectively terminated at the groove 44 (#2). The third optical waveguide is reflectively terminated at the end face 23A'. Cavities 36' and 38' of each of the fourth and fifth optical waveguides are reflectively coupled together at the end face 23A', and the cavity 38' of each of the fourth and fifth optical waveguides is reflectively terminated at the groove 44 (#1). Cavities 36' and 38' of the sixth optical waveguide are reflectively coupled together at the end face 23A', and the cavity 38' of the sixth optical waveguide is reflectively terminated at the groove 44 (#2).

In this manner, reflective coupling and reflective terminating of the optical waveguides 34' are carried out on the plural straight lines, thereby increasing the number of the optical waveguides 34' per unit area of the optical waveguide substrate 23'. As a result, the resolution of the WDM filter can be improved or the size of the WDM filter can be reduced.

The manufacturing method for this WDM filter and the forms of the reflective coupling and the reflective terminating will become easily understandable in accordance with the first preferred embodiment, so the description thereof will be omitted herein.

While the reflective coupling and the reflective terminating are realized by the reflectors formed from reflecting films in the above preferred embodiments, each reflector may be obtained by a grating. The grating may be prepared by making each optical waveguide or its near portion have a distribution of refractive index by thermal diffusion, ion exchange, ion implantation, or ultraviolet radiation to the substrate. Alternatively, the grating may be obtained by etching a part of each optical waveguide.

While the two grooves 44 (#1 and #2) are shown in FIG. 8, three or more grooves may be formed on the optical waveguide substrate. By forming a plurality of grooves on the optical waveguide substrate, reflective coupling on each optical waveguide may be carried out plural times.

Further, while the single reflector 40 is formed for each optical waveguide 34 as shown in FIG. 6A, a common reflector for all the optical waveguides 34 may be formed on the end face 23A.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
   a substrate;
   a slab optical waveguide, arranged in the substrate, having first and second end faces opposed to each other;
   a plurality of first optical waveguides arranged in the substrate and connected to said first end face of said slab optical waveguide; and
   a plurality of second optical waveguides arranged in the substrate and connected to said second end face of said slab optical waveguide, wherein each of said second optical waveguides includes
      a first cavity connected to said slab optical waveguide, and
      a second cavity acutely connected through a first reflecting surface to said first cavity, said second cavity being terminated by a second reflecting surface.

2. An optical device according to claim 1, wherein said first reflecting surface lies on a first straight line, and said second reflecting surfaces lies on a second straight line.

3. An optical device according to claim 2, wherein said second straight line is inclined with respect to said first straight line, thereby setting an optical path difference between said second optical waveguides.

4. An optical device according to claim 2, wherein at least one of said first and second straight lines comprises a plurality of straight lines.

5. An optical device according to claim 1, wherein an optical path difference is set between any adjacent ones of said second optical waveguides so as to give a phase difference by an integral multiple of 2π to light having a specific wavelength.

6. An optical device according to claim 1, wherein said first reflecting surface is provided by a reflecting film formed on an end face of said substrate.

7. An optical device according to claim 6, wherein said reflecting film comprises a copper, copper alloy, or dielectric multilayer film.

8. An optical device according to claim 6, wherein said end face of said substrate is provided by cutting with a cutting saw, so that said first reflecting surface lies on a straight line.

9. An optical device according to claim 1, wherein said second reflecting surface is provided by a reflecting film formed in a groove formed on said substrate.

10. An optical device according to claim 9, wherein said reflecting film comprises a copper, copper alloy, or dielectric multilayer film.

11. An optical device according to claim 9, wherein said groove on said substrate is formed by a cutting saw, so that said second reflecting surface lies on a straight line.

12. An optical device according to claim 9, further comprising a transparent substance for filling a portion of said groove corresponding to said first cavity.

13. An optical device according to claim 12, wherein each of said second optical waveguides has a first temperature coefficient of refractive index, and said transparent substance has a second temperature coefficient of refractive index, said second temperature coefficient having a sign different from that of said first temperature coefficient.

14. An optical device according to claim 12, wherein each of said second optical waveguides is formed of silica glass, and said transparent substance is formed of a polymeric material.

15. An optical device according to claim 14, wherein said polymeric material is selected from the group consisting of polyimide and polysiloxane.

16. An optical device according to claim 1, wherein said second end face of said slab optical waveguide lies on an arc.

17. An optical device according to claim 16, wherein at least portions of said second optical waveguides in the vicinity of said slab optical waveguide are arranged so as to extend radially from the center of said arc.

18. An optical device comprising:
   a substrate;
   a slab optical waveguide arranged on the substrate; and
   a plurality of individual optical waveguides arranged on the substrate, each individual optical waveguide including a first reflector dividing the optical waveguide into first and second waveguide portions, and a second reflector terminating the second waveguide portion, the first and second waveguide portions and the first and second reflectors being positioned relative to each other so that light travels out of the slab optical waveguide and then through the first waveguide portion to the first reflector, is then reflected by the first reflector to travel through the second waveguide portion to the second reflector, is then reflected by the second reflector to travel back through the second waveguide portion to the first reflector, is then reflected by the first reflector to then travel back through the first waveguide portion to the slab optical waveguide, and then travels back through the slab optical waveguide.

19. An optical device comprising:
   a substrate;
   a slab optical waveguide arranged on the substrate; and
   a plurality of individual optical waveguides arranged on the substrate, each individual optical waveguide including
      first and second waveguide portions each having first and second ends, and
      first and second reflectors, wherein the first and second waveguide portions and the first and second reflectors are positioned relative to each other so that light travels out of the slab optical waveguide into the first end of the first waveguide portion, then through the first waveguide portion and out of the second end of the first waveguide portion to the first reflector, is then reflected by the first reflector to travel into the first end of the second waveguide portion, then through the second waveguide portion and out of the second end of the second waveguide portion to the second reflector, is then reflected by the second reflector to travel back into the second end of the second waveguide portion, then through the second waveguide portion and out the first end of the second waveguide portion, and is then reflected by the first reflector to travel into the second end of the first waveguide portion, then through the first waveguide portion and out the first end of the first waveguide portion back into the slab optical waveguide.

20. An optical device according to claim 19, wherein the optical device is a wavelength division multiplexing (WDM) filter.

21. An optical device according to claim 19, wherein the optical device operates as a wavelength division multiplexing (WDM) multiplexer or a WDM demultiplexer.

22. An optical device according to claim 19, wherein each of the first reflectors lies on a first straight line, and each of the second reflectors lies on a second straight line.

23. An optical device according to claim 22, wherein the second straight line is inclined with respect to the first straight line.

24. An optical device according to claim 19, wherein an optical path difference is set between any adjacent ones of the second waveguide portions to provide a phase difference by an integral multiple of $2\pi$ to light having a specific wavelength.

25. An optical device as in claim 19, further comprising:

a plurality of input/output optical waveguides arranged on the substrate and connected to the slab optical waveguide so that a light travelling through a respective input/output optical waveguide travels into the slab optical waveguide, then through the slab optical waveguide to a respective individual optical waveguide, then through the first waveguide portion of the respective individual optical waveguide to the first reflector of the respective individual optical waveguide, is then reflected by the first reflector to travel through the second waveguide portion of the respective individual optical waveguide, is then reflected by the second reflector of the respective individual optical waveguide to travel back through the second waveguide portion of the respective individual optical waveguide, is then reflected by the first reflector of the respective individual optical waveguide to then travel back through the first waveguide portion of the respective individual optical waveguide back into the slab optical waveguide, then through the slab optical waveguide to the respective input/output optical waveguide.

26. An optical device comprising:

a substrate;

a slab optical waveguide, arranged on the substrate, having first and second end faces opposed to each other;

a plurality of first optical waveguides arranged on the substrate and connected to the first end face of the slab optical waveguide; and a plurality of second optical waveguides arranged in the substrate and connected to the second end face of the slab optical waveguide, wherein each of said second optical waveguides includes a first reflector which divides the respective second optical waveguide into first and second waveguide portions, and a second reflector which terminates the second waveguide portion, the first and second reflectors being positioned so that light travels out of the slab optical waveguide and then through the first waveguide portion to the first reflector, is then reflected by the first reflector to travel through the second waveguide portion to the second reflector, is then reflected by the second reflector to travel back through the second waveguide portion to the first reflector, is then reflected by the first reflector to then travel back through the first waveguide portion to the slab optical waveguide.

27. An optical device according to claim 26, wherein each of the first reflectors lies on a first straight line, and each of the second reflectors lies on a second straight line.

28. An optical device according to claim 27, wherein the second straight line is inclined with respect to the first straight line.

29. An optical device according to claim 26, wherein an optical path difference is set between any adjacent ones of the second waveguide portions to provide a phase difference by an integral multiple of $2\pi$ to light having a specific wavelength.

* * * * *